United States Patent
Schultze et al.

(10) Patent No.: US 11,853,989 B2
(45) Date of Patent: Dec. 26, 2023

(54) METHOD AND DEVICE FOR CONTROLLING THE ACCESS AND CONFIGURATION TO POINT OF SALE PERIPHERALS

(71) Applicant: Wincor Nixdorf International GmbH, Paderborn (DE)

(72) Inventors: Manuel Schultze, Hövelhof (DE); Janusz Misiek, Bielsko Biala (PL)

(73) Assignee: Diebold Nixdorf Systems GmbH, Paderborn (DE)

( * ) Notice: Subject to any disclaimer, the term of this patent is extended or adjusted under 35 U.S.C. 154(b) by 443 days.

(21) Appl. No.: 15/828,352

(22) Filed: Nov. 30, 2017

(65) Prior Publication Data
US 2018/0150820 A1 May 31, 2018

(30) Foreign Application Priority Data
Nov. 30, 2016 (EP) .................................. 16201358

(51) Int. Cl.
G06Q 20/20 (2012.01)
G07G 1/14 (2006.01)
H04L 12/46 (2006.01)

(52) U.S. Cl.
CPC ........... *G06Q 20/202* (2013.01); *G06Q 20/20* (2013.01); *G07G 1/14* (2013.01); *H04L 12/4633* (2013.01)

(58) Field of Classification Search
CPC ..... G06Q 20/202; G07G 1/14; H04L 12/4633
USPC ........................................................ 705/21
See application file for complete search history.

(56) References Cited

U.S. PATENT DOCUMENTS

| | | | | |
|---|---|---|---|---|
| 6,141,708 A | * | 10/2000 | Tavallaei | G06F 13/4027 710/100 |
| 8,711,403 B2 | * | 4/2014 | Watanabe | G06F 3/1225 358/1.13 |
| 2003/0135418 A1 | | 7/2003 | Shekar | |
| 2005/0165979 A1 | * | 7/2005 | Kato | G06F 9/44505 710/15 |
| 2007/0149124 A1 | * | 6/2007 | Onozawa | H04W 8/005 455/41.2 |

(Continued)

OTHER PUBLICATIONS

European Search Report dated Feb. 16, 2017, for corresponding European Application No. EP 16 20 1358.

*Primary Examiner* — Luna Champagne
(74) *Attorney, Agent, or Firm* — Black McCuskey

(57) ABSTRACT

A method for configuring a POS-System, which uses multiple peripheral devices to complete a transaction, and uses a device server to which all peripheral devices are registered and logically connectable a POS-System, includes the steps of:
- before starting a transaction on the POS-System, requesting the peripheral devices from the device server to dedicate the devices to the POS-System;
- once the request is granted, starting the transaction and informing the device server about the start of the transaction for blocking access to the peripheral devices for another POS-System; and
- when a request for a peripheral device from another POS-System is received from the devices server, checking if a transaction is pending for the peripheral device from the POS system and if the transaction is pending the request is automatically declined and if no transaction is pending the device is reassigned to the other POS-System.

1 Claim, 4 Drawing Sheets

(56) References Cited

U.S. PATENT DOCUMENTS

| | | | | |
|---|---|---|---|---|
| 2007/0276763 | A1* | 11/2007 | Kleinman | G06Q 20/202 |
| | | | | 705/64 |
| 2008/0144075 | A1* | 6/2008 | Love | H04L 63/029 |
| | | | | 358/1.15 |
| 2008/0301340 | A1* | 12/2008 | Stotz | G06F 9/5077 |
| | | | | 710/68 |
| 2012/0066079 | A1* | 3/2012 | Falzone | G07F 7/08 |
| | | | | 705/16 |
| 2012/0182939 | A1* | 7/2012 | Rajan | G06F 19/3418 |
| | | | | 370/328 |
| 2014/0006189 | A1* | 1/2014 | Takasu | G06Q 20/204 |
| | | | | 705/17 |
| 2014/0281527 | A1* | 9/2014 | Kobres | H04L 9/3239 |
| | | | | 713/168 |
| 2015/0081462 | A1* | 3/2015 | Ozvat | G06Q 20/40 |
| | | | | 705/21 |
| 2015/0295997 | A1* | 10/2015 | Takasu | G07G 1/12 |
| | | | | 709/203 |
| 2016/0077984 | A1* | 3/2016 | Steinert | G06F 13/1642 |
| | | | | 710/309 |
| 2016/0360477 | A1* | 12/2016 | Saeki | B41J 29/38 |
| 2016/0364710 | A1* | 12/2016 | Kim | G06Q 20/209 |

* cited by examiner

METHOD AND DEVICE FOR CONTROLLING THE ACCESS AND CONFIGURATION TO POINT OF SALE PERIPHERALS

CROSS-REFERENCE TO RELATED APPLICATIONS

This application claims priority to and the benefit of European Patent Application No. 16201358.5, Filed 30 Nov. 2016, the contents of which are hereby incorporated by reference in their entirety.

BACKGROUND

This relates in general to retail services.

In the retail, not only do Point of Sale (POS) devices play an important role but also does the framework behind these devices.

The point of sale (POS) or point of purchase (POP) is the time and place where a retail transaction is completed. Typically at the point of sale, a merchant will calculate an amount owed by the customer and indicate the amount, and may prepare an invoice for the customer (for example, which may be a cash register printout), and may indicate the options for the customer to make payment. It is also the point at which a customer may make a payment to the merchant in exchange for goods or services. After receiving payment, the merchant may issue a receipt for the transaction, which is usually printed, but is increasingly being dispensed with or sent electronically.

To calculate the amount owed by a customer, the merchant may use any of a variety of aids available, such as weighing scales, bar code scanners, electronic and manual cash registers, among many tools. To make a payment, EFT/POS terminals, touch screens, and/or a variety of other hardware and software options are available.

The point of sale is sometimes also referred to as a point of service because it may not just be a point of sale but may also be, for example, a point of return or a point of customer order. Additionally, current POS terminal software may include additional features to cater for different functionality, such as inventory management, CRM, financials, or warehousing, and the like.

Businesses are increasingly adopting advanced POS systems. One of reasons is that advanced POS systems may do away with the need for price tags. Selling prices may be linked to the product code of an item when adding stock, so a cashier may merely scan this code to process a sale. If there is a price change, this may also be easily done through an inventory window, for example. Other advantages include ability to implement various types of discounts, a loyalty scheme for customers, and more efficient stock control.

These services may provide real added value to retailers as it may provide and expose centralized business logic and domain data to their systems, thus providing a consistent customer experience across channels independent of the touch-point used.

Next to the consistency, the services may also reduce architecture complexity, point-to-point connectivity and allow projects to easily extend business functionality in an isolated and controlled manner reducing project risks and costs.

Based on this flexibility layer approach it is intended that the peripheral devices, which are in general connected to a POS terminal, can also be used in a flexible manner Normally POS terminals have several peripheral devices, which are connected via serial cable/USB/Bluetooth/IrDA etc. to a mainboard, which is very often a standard PC board on which a standard operating system is running. This operating system implements the POS functionality. The peripheral devices are normally exclusively assigned to the POS terminal so that no sharing of the devices with other POS terminals is possible. Especially for mobile POS or virtual POS that run on a tablet or any other mobile device it is from time to time necessary to connect to the peripheral devices of the local POS system. Thus, the connection may be exclusive to one POS device (POS Terminal or mobile device).

For Example, US 2014/0006189 A1 and US 2003/1354418 A1 disclose pairing concepts of mobile POS and external devices.

SUMMARY

This relates more particularly to access to and configuration of point of sale peripherals.

In one embodiment, an approach includes providing services, which allow extendibility, scalability, performance, and security. This is done, for example, by a service framework, which provides to customers and projects standardized public interfaces to the outside world and connect any enterprise application via its extendable adapter framework, thus making touch-point enterprise system agnostic and reducing touch-point customization to a minimum. For examples, see FIGS. 1-4, with layers and structures of retail system infrastructure from POS systems to enterprise resource planning (ERP) particularly shown in FIGS. 1-2.

In at least one embodiment, a system includes improved usability of peripheral devices and flexibility of their assignment.

In at least one embodiment, a method for configuring a POS system, which uses several peripheral devices to complete a transaction, and uses a device server at which peripheral devices are registered and are logically connectable a POS terminal, includes the steps of:
  before starting a transaction on the POS terminal, requesting the peripheral devices from the device server to dedicate the devices to the POS terminal;
  once the request is granted, starting the transaction and informing the device server about the start of the transaction for blocking the access to the peripheral devices for another POS terminal;
  when a request for a peripheral device from another POS terminal is received from the device server, it is checked if a transaction is pending for the peripheral device and if the transaction is pending the request is automatically declined and if no transaction is pending the device is assigned to the other POS terminal.

In at least one embodiment, the device server is a service, which runs on a central computer system, which may be accessible, by a plurality of POS terminals. The device service may be connected via a network to other components. By the central device service, logical local control of peripheral devices by the POS terminals may be broken. In at least one example, a POS terminal does not control directly the information flow and the assignment of peripheral devices to the POS terminal; this may be done by the central device server.

In this example, provides central control where all peripheral devices and plug-ins on the POS system are stored on the central device service and may be running such that the central device service is responsible for controlling the access to the peripheral devices and establishes connections to the central device service. In general, tunneling of information may be performed.

In this example, to allow a transfer of the devices to another POS terminal, it may be checked whether a transaction is pending and whether the peripheral device is assigned to a POS terminal. If this is the case, a message is sent to the POS terminal when another POS terminal is requesting the peripheral device. The device server sends a confirmation message to the POS terminal to which the peripheral device is assigned requesting a confirmation to release the device. In general, this message may be displayed on a monitor of the POS terminal, and a user may be requested to allow that the peripheral device to be transferred to another POS terminal.

If the user agrees, the peripheral device may be transferred.

If no response to the confirmation message is sent for a predetermined time interval, the peripheral device may be removed from the POS terminal and assigned to the other POS terminal.

These devices may include, without being limited to, one or more of the following: POS printer, line display, scale, fiscal printer, scanner, cash drawer, and the like.

In one example to implement the tunneling, the POS terminal to which one or more peripheral devices are physically connected, a device service may be running that controls the communication to the device server and the peripheral devices and supports the assignment of the device server.

The device service may tunnel the communication between the device server and the peripheral devices, so that the POS terminal does not directly communicate with the connected peripheral devices but with the device service and the device server.

In addition and in combination with the handling devices, POS peripherals may be accessed through a web interface based on REST and web socket communication provided by the Device Service. This may allow sharing these devices between the POS terminal and web applications like Mobile POS.

Accordingly, it is possible to access the following peripherals via the Device Service on POS: POS printer, Fiscal printer, Customer line display, Scale Transaction Module (price calculating scale), EFT/POS device, and the like.

In at least one example, POS peripherals are connected via UPOS, except for the Fiscal printer and the Scale Transaction Module, which are connected via OPOS, RFID, or EFT, which are connected through the Device Service. It may be that when a Scale Transaction Module is connected via Device Service, a POS printer is also connected through the Device Service.

In one embodiment, the sharing of POS peripherals with mobile devices is possible when the peripherals are connected via the Device Service. To share the peripherals between stationary POS and mobile devices, the concept of "leading system" has been included. The leading system concept means that when a system, whether a stationary POS device or a mobile device, is currently in the middle of a transaction, it will automatically decline an incoming request to use the peripheral that a workstation or a mobile device is using. Subsequently, if the system is not in the middle of a transaction, the request may be granted or denied by the operator currently using the requested peripheral. It is possible to configure that the request is automatically granted in case the currently connected system does not respond with X amount of seconds. Besides, during a transaction, sharing is not possible when printing has been started, during an EFT payment and during the weighing of an item.

In at least one embodiment, a device server is able to offer the peripherals to a Mobile POS device and a traditional POS terminal.

In at least one embodiment, to avoid implementing device integrations twice, once for the POS terminal and again for the device server, business logic may be implemented as plug-ins. These plug-ins may be used by the POS system and by Mobile POS devices (or any other client such as the iSCAN Adapter) and use the same business logic, this has following advantages:

one point of configuration,
same output independent of the client platform, and
reduced development effort.

In at least one embodiment, the device server supports Mobile POS devices and traditional POS terminals, for this, the following features may be implemented:

sharing concept of leading system and related business rules,
plug-in concept for POS terminals and Mobile POS devices and sharing the same implementation based on plug-ins—same presentation may be used and same parameters may be applied to all clients without separate configurations.

In at least one embodiment, POS printer logic is refactored into plug-ins; a traditional POS terminal may switch in the POS model to use the UDM connection or the Device Server. When the POS terminal connects to the device server, it may be able to share the printer with other clients configured to use also this device server. Most preferably, the traditional POS terminal will be configured as leading system so that the printer is the most of the time assigned to the POS terminal.

In at least one embodiment, a Scale Transaction Module is integrated in the device server so that the use of scales is granted and to get information about the supported models and countries.

In at least one embodiment, the device server takes care for the routing and the definition of the interface that the clients can use. The concrete implementation of the methods, which indeed implies the transformation of the EFT messages to the concrete EFT protocol (e.g. OPI . . . ) may be done in business logic components (plug-ins). These plug-ins may be modified or enhanced by the customizers to make adaptations to the existing protocol or to create a complete new protocol integration.

Various aspects will become apparent to those skilled in the art from the following detailed description and the accompanying drawings.

DETAILED DESCRIPTION

Figure 1:
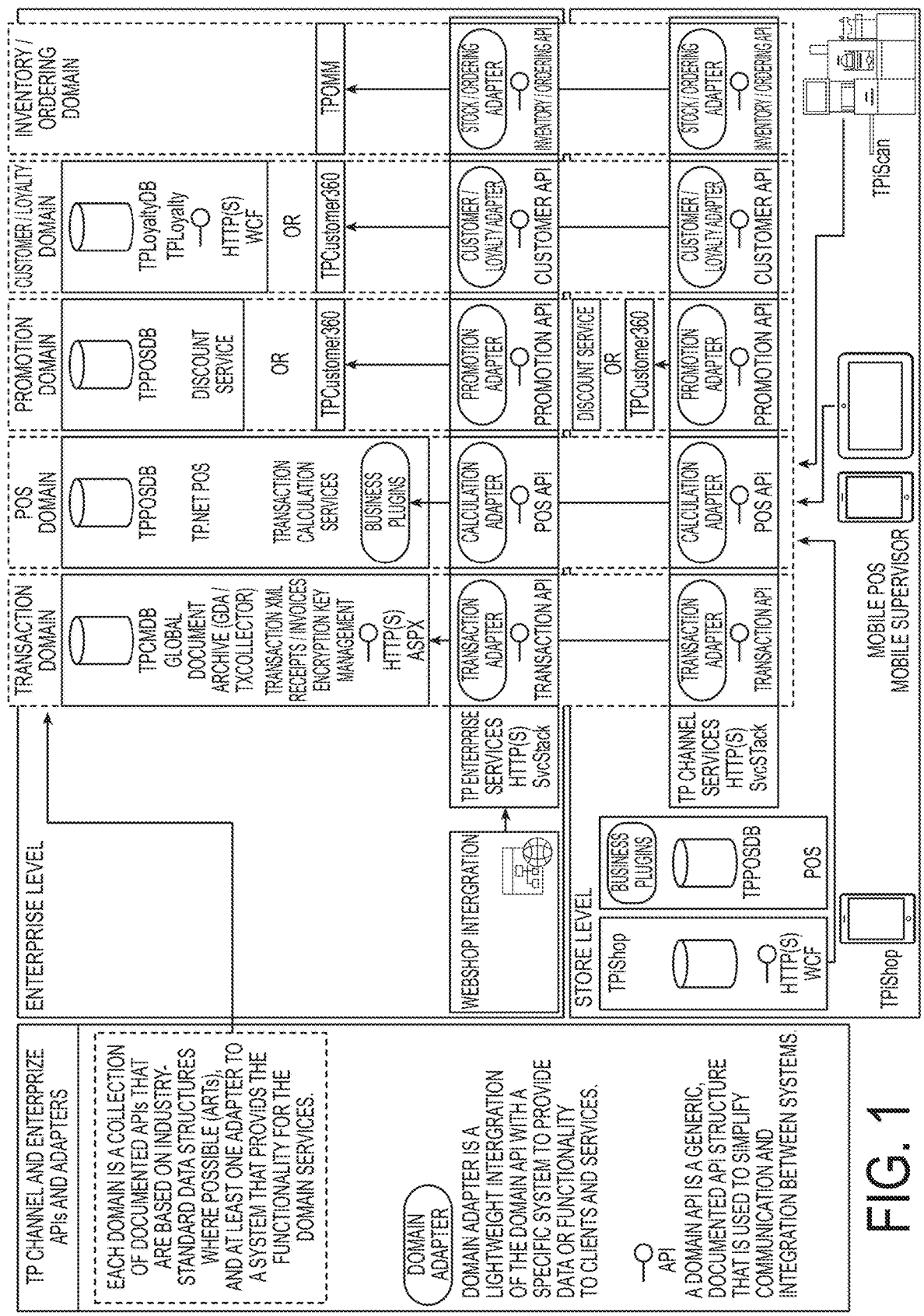
FIG. 1 is a layer structure representation including a POS with connections.
Figure 2:
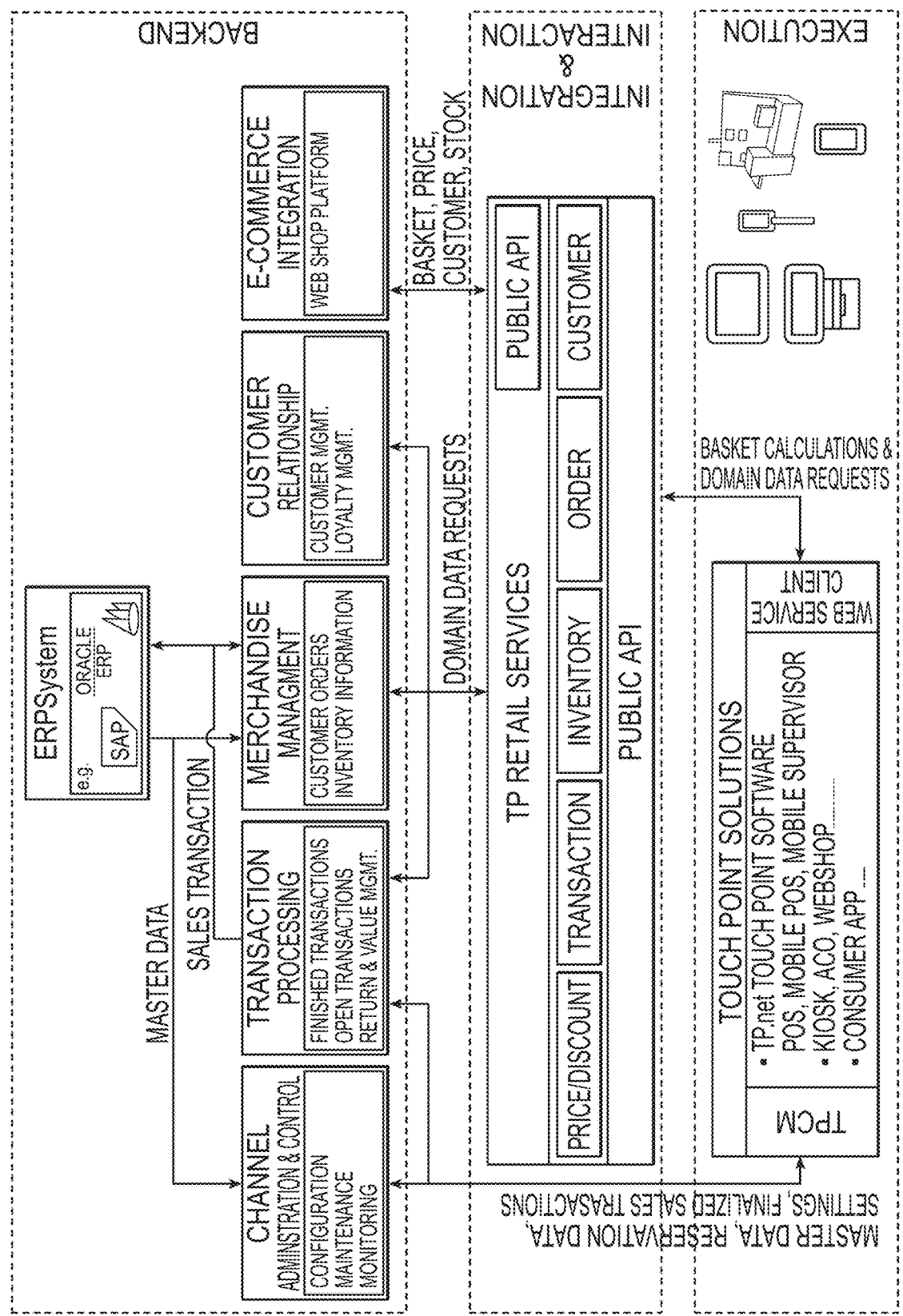
FIG. 2 is an alternative layer structure representation.

Referring now to the drawings, there is illustrated in FIG. 1 a structure of a system including a transaction domain, a POS domain, a promotion domain, a customer/loyalty domain, an inventory/ordering domain. These domains have different functionalities for different purposes. As shown in FIG. 2, these domains are part of the integration and interaction level. This level is logically located between a back-end and an execution level. In the execution level, the POS are located. The POS also cover web approaches, mobile POS, stationary POS, and TPiSCAN devices. TPiSCAN devices are self-checkout devices, which allow customers to scan products and to generate an invoice by themselves without necessarily support of any staff of a shop or business. All these units are connected to the POS domain. In this POS, domain adapters are located, which provide APIs to allow plug-ins to be implemented which can cover various POS types and their devices.

FIG. 2 further shows representation of the different levels. The backend system comprises an ERP system wherein the integration and interaction level comprise an integration for the POS in the execution level, including the POS and its adapter especially also the device service.

Figure 3:
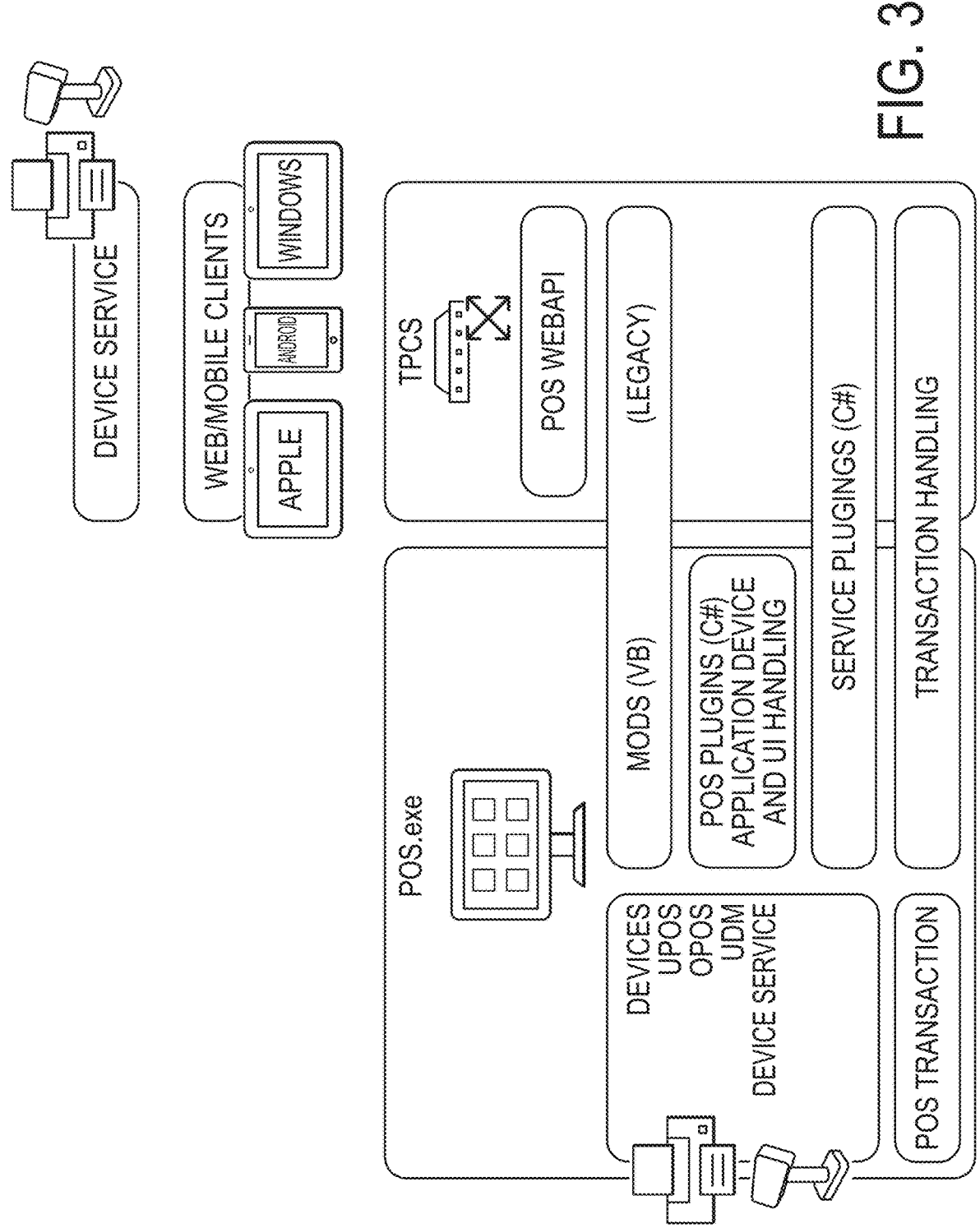
FIG. 3 is another layer structure representation including the POS and connection to a device service.

FIG. 3 shows the POS and the servers running on the POS, namely POS.exe. POS plug-ins on the POS implement the service on the POS, which is connected to the device service. As shown in FIG. 3, transaction handling is also running on the POS, which indicates that transaction is pending and that the peripheral devices cannot be used by another POS. This information is provided to the device service. Mobile clients, which are for example web clients, may then request from the device service the peripheral devices connected to the POS and controlled by the POS.exe. To provide an integrated approach, which allows access to different devices from different clients, several layers are implemented on the services running on the POS. There are service plug-ins, POS plug-ins and plug-ins to support legacy devices. Also, there must be a connection to the device service.

Figure 4:
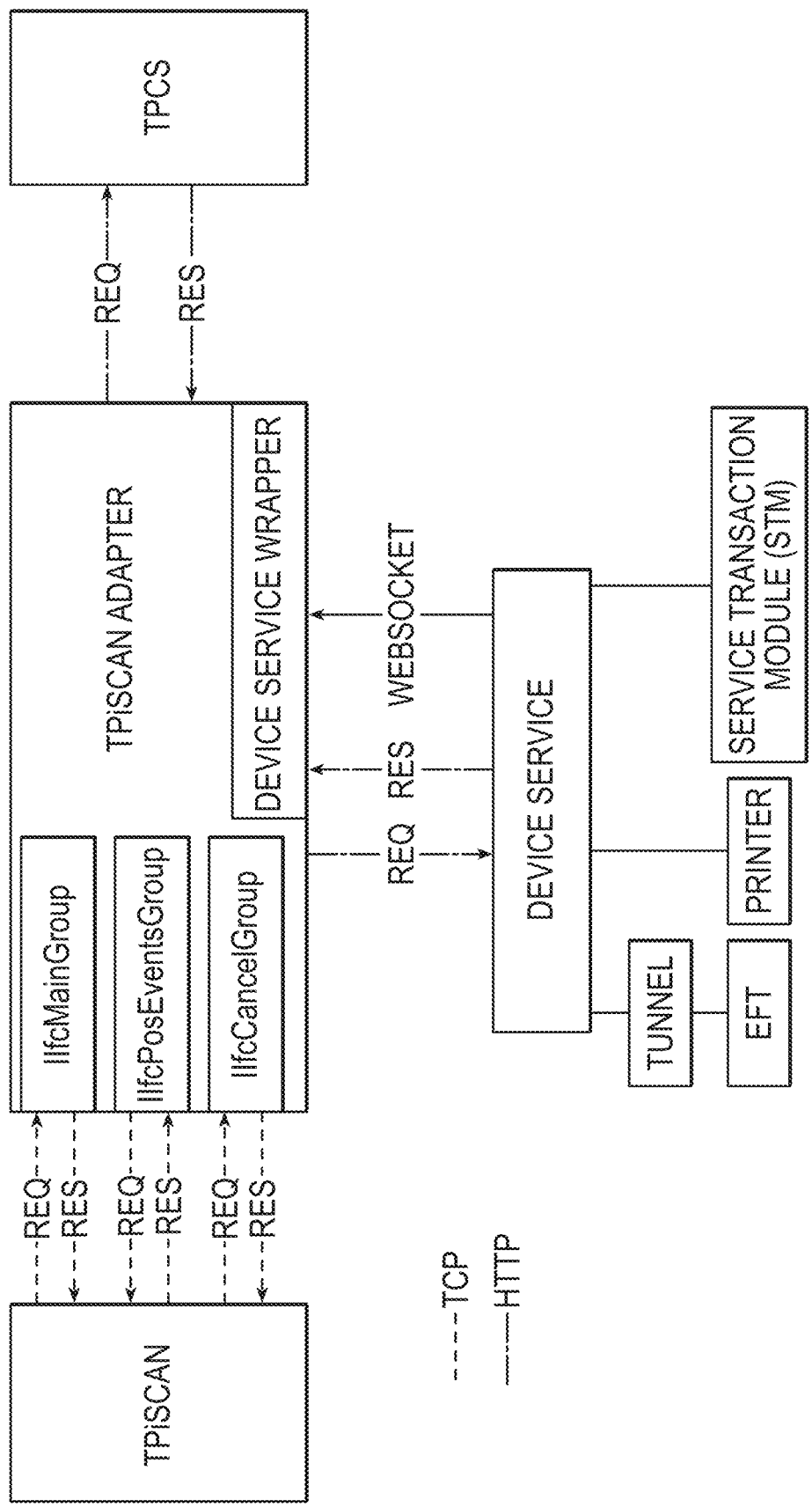
FIG. 4 is detailed structure of the device service with a tunnel of an EFT/POS to provide control of devices to the device service.

FIG. 4 shows a central device service to which the printer and the scale transaction module is connected. The POS/EFT is connected via tunnel to the device service. The device service is connected to a TPiSCAN device in this configuration using a device service wrapper, which is a layer using standard API. The device service wrapper is the service running on the TPiSCAN device, which allows the connection to the device service. The device service allows the TPiSCAN device to request for a printer or scale transaction module. These physical devices can be normally connected to an EFT/POS. By using a tunnel, these devices can be transparently presented to the TPiSCAN device. Transparently means in this context that it is not visible to which POS the physical devices are connected.

While principles and modes of operation have been explained and illustrated with regard to particular embodiments, it must be understood, however, that this may be practiced otherwise than as specifically explained and illustrated without departing from its spirit or scope.

What is claimed is:

1. A method for configuring a Point of Sale ("POS") system, which uses several peripheral devices to complete a transaction, and uses a device server at which the peripheral devices are registered and logically connectable to a plurality of POS devices, comprising the steps of:

before starting a transaction on a first POS device of the plurality of POS devices, requesting at least one peripheral device of the several peripheral devices from the device server to assign the at least one peripheral device to the first POS device;

once the request is granted, starting the transaction with the first POS device and informing the device server about the start of the transaction for blocking access to the at least one peripheral device for a second POS device of the plurality of POS devices;

providing a transaction handling on the plurality of POS devices indicating that the transaction is pending and that the peripheral device used by the first POS device cannot be used by the second POS device, the transaction handling also providing this information to the device server;

when a request for the at least one peripheral device from the second POS device is received by the device server, it is checked if a transaction is pending for the at least one peripheral device and where a transaction is pending, the request is automatically declined, and if no transaction is pending the at least one peripheral device is reassigned to the second POS device;

where the at least one peripheral device is physically connected to the first POS device and where a device service is running on the device server that controls the communication to the device server and to the at least one peripheral device and supports assignment by the device server;

where the device service tunnels the communication between the device server and the at least one peripheral device, such that the first POS device does not directly communicate with the connected at least one peripheral device but with the device service and the device server;

where each of the first and second POS devices is configured to use the several peripheral devices to complete a transaction;

where the several peripheral devices are transparently presented to the first POS device and the second POS device, whereby it is not visible to the first POS device and the second POS device to which of the other of the first POS and the second POS device the several peripheral devices are connected;

refactoring a POS printer logic into a plug-in;

granting use of scales to the plurality of POS devices through a scale transaction module integrated to the device server;

where when no transaction is pending and the at least one peripheral device is assigned to the first POS device and when the second POS device is requesting the at least one peripheral device the device server sends a confirmation message to the first POS device to which the at least one peripheral device is assigned requesting a confirmation to release the at least one peripheral device, and requesting a response of a user of the first POS device;

where when no response to the confirmation message is sent from the first POS device for a predetermined time interval the at least one peripheral device is removed from the first POS device and reassigned to the second POS device;

where the at least one peripheral device is one of a POS printer, a line display, a scale, a fiscal printer, a scanner, and a cash drawer;

wherein the request is automatically granted when one of the plurality of POS devices that is currently connected and stationary does not respond in a predetermined amount of seconds;

and further comprising:

implementing business logic applied by the device service and the plurality of POS devices as plug-ins to thereby avoid implementing device integrations twice; and routing, with the device server, a definition of an interface that the plurality of POS devices use.

\* \* \* \* \*